United States Patent [19]

Ekins et al.

[11] Patent Number: 5,505,052

[45] Date of Patent: Apr. 9, 1996

[54] PROCESS AND UNIT FOR SUPPLYING A GAS UNDER PRESSURE TO AN INSTALLATION THAT CONSUMES A CONSTITUENT OF AIR

[75] Inventors: Robert Ekins; Alain Guillard, both of Paris, France

[73] Assignee: L'Air Liquide, Societe Anonyme pour l'Etude et l'Exploitation des Procedes Georges Claude, Paris Cedex, France

[21] Appl. No.: 242,452

[22] Filed: May 13, 1994

[30] Foreign Application Priority Data

Jun. 7, 1993 [FR] France .................................. 93 06789

[51] Int. Cl.$^6$ ....................................................... F25J 3/02
[52] U.S. Cl. ............................ 62/40; 62/25; 62/38; 62/41
[58] Field of Search ..................................... 62/25, 26, 37, 62/38, 41, 40

[56] References Cited

U.S. PATENT DOCUMENTS

| | | | |
|---|---|---|---|
| 3,174,293 | 3/1965 | Jakob et al. ................................. | 62/39 |
| 3,210,950 | 10/1965 | Lady ........................................ | 62/41 X |
| 3,426,543 | 2/1969 | Becker ...................................... | 62/41 X |
| 4,529,425 | 7/1985 | McNeil ...................................... | 62/37 |
| 4,853,015 | 8/1989 | Yoshino ..................................... | 62/40 |
| 5,082,482 | 1/1992 | Darredeau .................................. | 62/24 |
| 5,084,081 | 1/1992 | Rohde ....................................... | 62/41 X |
| 5,152,149 | 10/1992 | Mostello et al. ........................... | 62/41 X |
| 5,157,926 | 10/1992 | Guilleminot .............................. | 62/38 X |
| 5,265,429 | 11/1993 | Dray ........................................ | 62/38 X |
| 5,287,704 | 2/1994 | Rathbone .................................. | 62/41 X |
| 5,408,831 | 4/1995 | Guillard et al. ........................... | 62/24 |

FOREIGN PATENT DOCUMENTS

| | | |
|---|---|---|
| 0504029 | 9/1992 | European Pat. Off. . |
| 2-293575 | 12/1990 | Japan . |
| 929798 | 6/1963 | United Kingdom . |

Primary Examiner—Christopher Kilner
Attorney, Agent, or Firm—Young & Thompson

[57] ABSTRACT

Air is distilled in a distillation apparatus (13) associated with a heat exchange line (11) in which is circulated a heat transfer fluid under high pressure. A storage (20, 23) is supplied, at least intermittently, with gas in liquid phase; and gas in liquid phase withdrawn from the storage is raised to a vaporization pressure, and vaporized under this pressure in the heat exchange line (11). The supply of liquefied gas to the storage can be from the distillation apparatus (13) and/or from an external source such as a tank truck (29, 34). It is useful particularly for the supply of oxygen, nitrogen and argon under pressure to installations for the production of stainless steel such as electric arc furnaces.

13 Claims, 2 Drawing Sheets

PROCESS AND UNIT FOR SUPPLYING A GAS UNDER PRESSURE TO AN INSTALLATION THAT CONSUMES A CONSTITUENT OF AIR

The present invention relates to a process for supplying to a consuming installation at least one constituent of air from a gas under pressure liquefiable at a cryogenic temperature under this pressure.

The invention is applicable in particular to the supply of certain metallurgical installations with oxygen and/or nitrogen and/or argon.

The pressures in question hereinafter are absolute pressures.

Certain metallurgical installations consume simultaneously gaseous oxygen under pressure, gaseous nitrogen under pressure and gaseous argon under pressure, for example electric arc furnaces adapted to produce stainless steel (AOD process). The pressure of utilization of these gases is typically of the order of 25 bars, with very variable consumption, which requires the use of "buffers" or auxiliary storage supplied under a pressure of the order of 30 to 40 bars.

Oxygen and nitrogen are generally produced by an air distillation unit at the site, and the quantities of argon necessary are much greater than the production capacity of argon of this distillation unit, which cannot exceed 5 percent of the oxygen flow. It is therefore necessary to provide the installation with argon from an external source. In the prior art, this argon is vaporized in a supplemental apparatus such as a hot water bath.

Moreover, the evolution of the technology as well as the production requirements have as a consequence a progressive increase in consumption of oxygen in arc furnaces, which often ultimately greatly exceeds the separation capacity of the distillation apparatus at the site.

The invention has for its object to provide a process permitting satisfying in a particularly economical fashion the gas requirements, even very changeable, of the installation.

To this end, the invention has for its object a process of the above type, characterized in that:

air is distilled in a distillation apparatus associated with a heat exchange line in which is circulated at least one heat transfer fluid under a high pressure substantially greater than the operating pressure of the distillation apparatus;

a storage is supplied in an intermittent fashion with said gas in liquid phase; and at least a portion of the gas under pressure is produced by bringing the gas in liquid phase withdrawn from the storage to a vaporization pressure higher than its storage pressure, and vaporizing it under this vaporization pressure in the heat exchange line associated with the distillation apparatus.

The process can comprise one or several of the following characteristics:

at least a portion of the storage is supplied from an external source;

the heat of vaporization/reheating of said gas is at least partially recuperated by producing an additional flow of liquid oxygen and/or liquid nitrogen;

there is produced simultaneously at least one constituent of air under pressure by bringing this constituent in liquid phase withdrawn from the distillation apparatus, to a vaporization pressure higher than its withdrawal pressure, and by vaporizing this liquid under this vaporization pressure in the heat exchange line;

said gas is an air gas whose flow rate is greater than the flow rate of this gas produced at the same moment by the distillation apparatus;

said vaporization is effected continuously;

during certain periods, there is sent from the distillation apparatus to the storage, gas in liquid phase, and, during other periods, said vaporization is performed.

The invention also has for its object a unit adapted to practice such a process. This unit, of the type comprising an air distillation apparatus associated with a heat exchange line which comprises passages for at least one heat transfer fluid under high pressure substantially greater than the operating pressure of the distillation apparatus, is characterized in that it comprises a storage of said gas in liquid phase adapted to be supplied at least intermittently, and means for compressing this gas in liquid phase connected upstream of this storage and downstream of the vaporization passages for this gas under pressure in the heat exchange line.

The unit can comprise one or several of the following characteristics:

compression means can also be connected downstream of an auxiliary vaporization device;

said gas being an air gas, the compression means are connected only to the storage, this latter being if desired connected to the distillation apparatus;

the unit comprises a pump for said gas in liquid phase, whose inlet is connected to the distillation apparatus;

the output of the pump is connected to vaporization passages of the heat exchange line separate from those associated with the compression means.

Examples of embodiment of the invention will now be described with respect to the accompanying drawings, in which.

Figure 1:
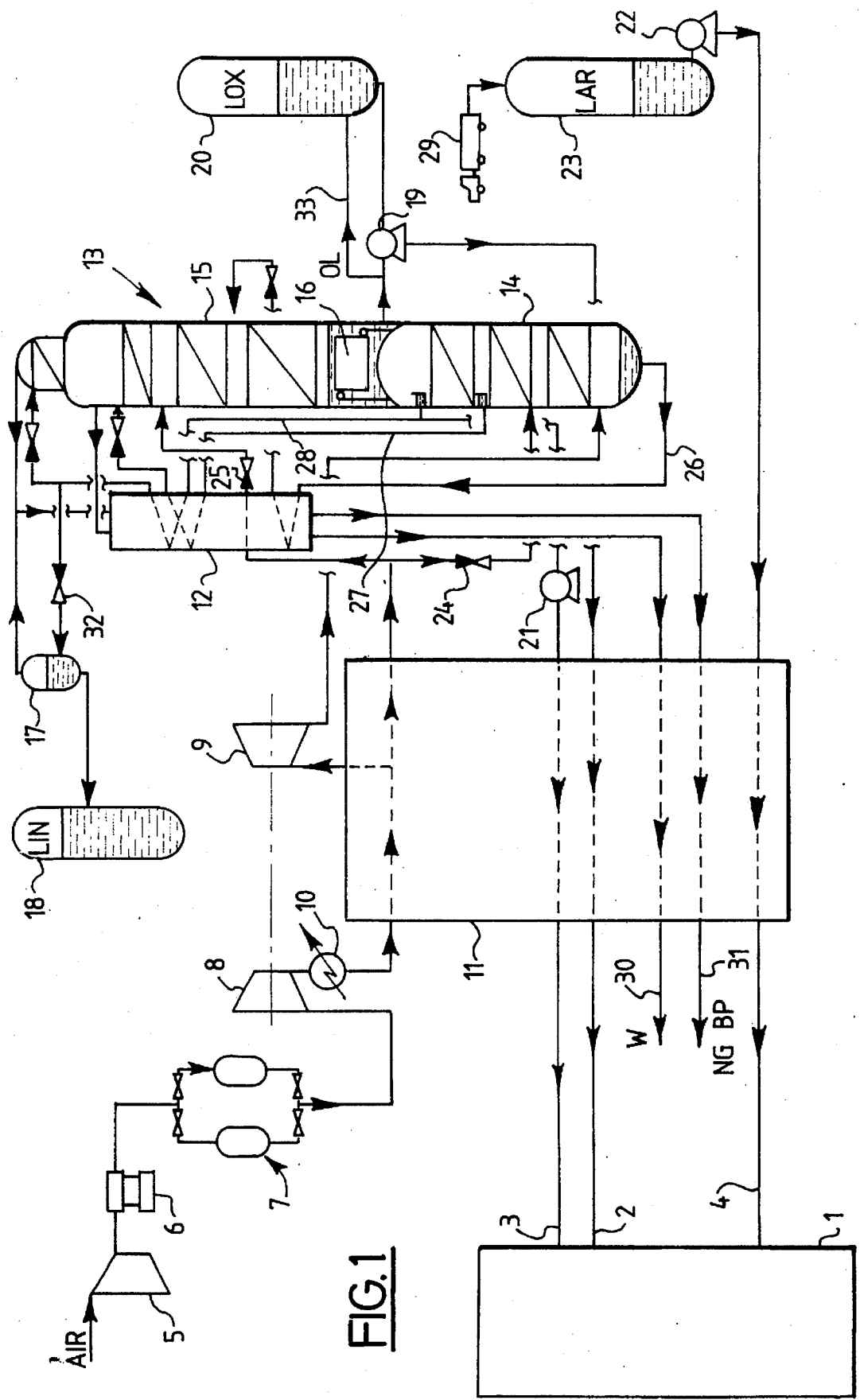
FIG. 1 represents schematically a unit according to the invention.

There is shown in FIG. 1 a unit adapted to supply to a consumption installation 1, which is typically a metallurgical installation practicing a process of the AOD type, on the one hand gaseous oxygen under pressure, carried by a conduit 2, on the other hand gaseous nitrogen under pressure, carried by a conduit 3, and finally argon under pressure, carried by a conduit 4. This unit also produces low pressure gaseous nitrogen, which is to say adjacent atmospheric pressure, as well as liquid oxygen and liquid nitrogen, these liquids being also under roughly atmospheric pressure.

The unit consists essentially in an atmospheric air compressor 5; a refrigeration group 6; a device 7 for drying and carbon dioxide removal from the air by absorption; a blower 8 and an expansion turbine 9 whose rotors are keyed on the same shaft, the blower being provided with an air or water refrigerant 10; a heat exchange line 11 of the countercurrent type; a subcooler 12; a distillation apparatus 13 constituted by a double column of the "minaret" type, comprising a medium pressure column 14 which operates at about 5 to 6 bars and which is surmounted by a low pressure column 15 operating at about 1.2 bar, the head of the column 14 being coupled to the base of column 15 by an evaporator-condenser 16; a phase separator 17; a storage 18 for liquid nitrogen; a liquid oxygen pump 19; a storage 20 for liquid oxygen; a liquid nitrogen pump 21; the liquid argon pump 22; and a storage 23 for liquid argon. The three storages 18, 20 and 23 are at substantially atmospheric pressure.

In operation, atmospheric air to be distilled, compressed in 5 and then cooled in 6, is purified of water and carbon dioxide in 7 and then further compressed in its entirety in 8 and brought to the vicinity of ambient temperature in 10. The further compressed air, which is at a high pressure substantially greater than the medium pressure of column 14, is cooled in its totality to an intermediate temperature T in the heat exchange line 11. At this temperature, a portion of the air is cooled and is liquified and if desired subcooled by passage to the cold end of the heat exchange line, then, after expansion in expansion valves 24 and 25, divided between the two columns 14 and 15.

At temperature T, the rest of the air is expanded to medium pressure in 9 and then introduced into the base of column 14.

There is also indicated in the drawing the conventional conduits and double minaret conduits, which is to say producing at the head of the low pressure column pure nitrogen under this low pressure. The conduits 26 to 28 for raising respectively "rich liquid" (air enriched in oxygen), "lower poor liquid" (impure nitrogen) and "upper poor liquid" (practically pure nitrogen), emerge respectively from the base, an intermediate point in the head of column 14, passing through the subcooler 12 and being each provided with an expansion valve.

The oxygen destined for the installation 1 is withdrawn in liquid form from the base of the column 15, brought to the utilization pressure by the pump 19, and vaporized and reheated to about ambient temperature in the heat exchange line.

Similarly, the nitrogen destined for installation 1 is withdrawn in liquid phase from the head of the column 14, brought to its utilization pressure by the pump 21, and vaporized and reheated to about ambient temperature in the heat exchange line.

Argon destined for the installation 1 is stored in liquid phase in storage 23, supplied by tank trucks 29. The liquid argon is withdrawn from this storage, brought to its utilization pressure by the pump 22, and vaporized and reheated to about ambient temperature in the heat exchange line.

In a conventional manner, the impure nitrogen constituting the residual gas of the installation and the pure nitrogen product at the head of column 15 are reheated in 12 and then in 11 and leave the unit, respectively, via conduits 30 and 31.

The unit produces moreover liquid nitrogen, withdrawn by the conduit 28 and expanded in an expansion valve 32 before being introduced into the phase separator 17. The liquid from this phase separator is sent to storage 18, while the vapor phase is combined with the gaseous nitrogen flow from the top of column 15. The unit also produces liquid oxygen, withdrawn from the base of column 15 and sent to storage 20 via a conduit 33. As will be understood, the additional quantity of cold introduced into the heat exchange line by the vaporization and reheating of the liquid argon is recovered to produce liquid oxygen and/or liquid nitrogen.

As a modification, the air distillation apparatus can comprise a column for argon production coupled in conventional manner to the column 15, so as to produce a portion of the argon supply to the installation 1.

Figure 2:
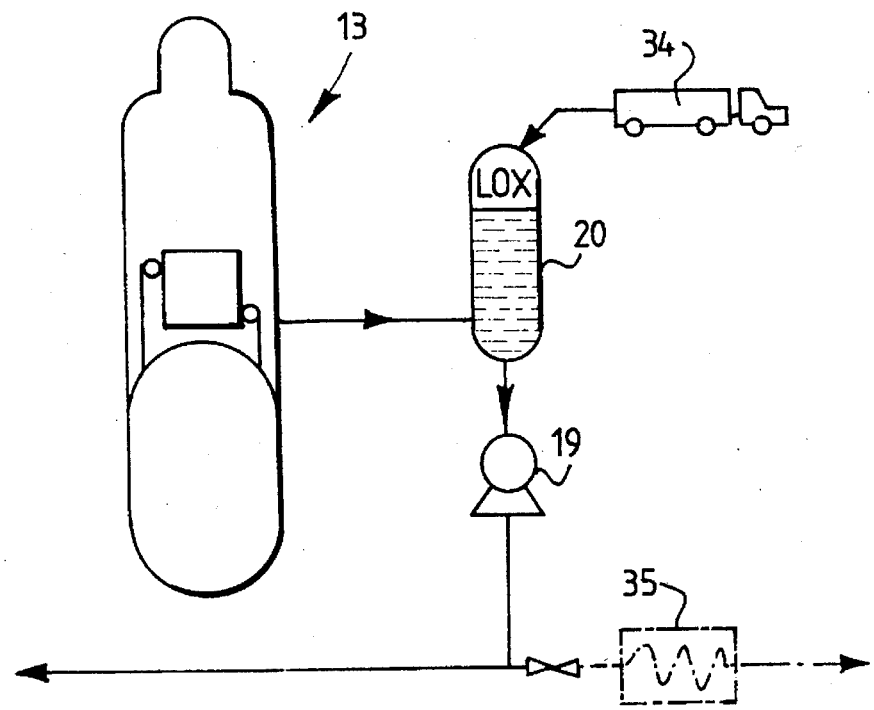
FIGS. 2 and 3 show schematically and partially two modifications.
Figure 3:
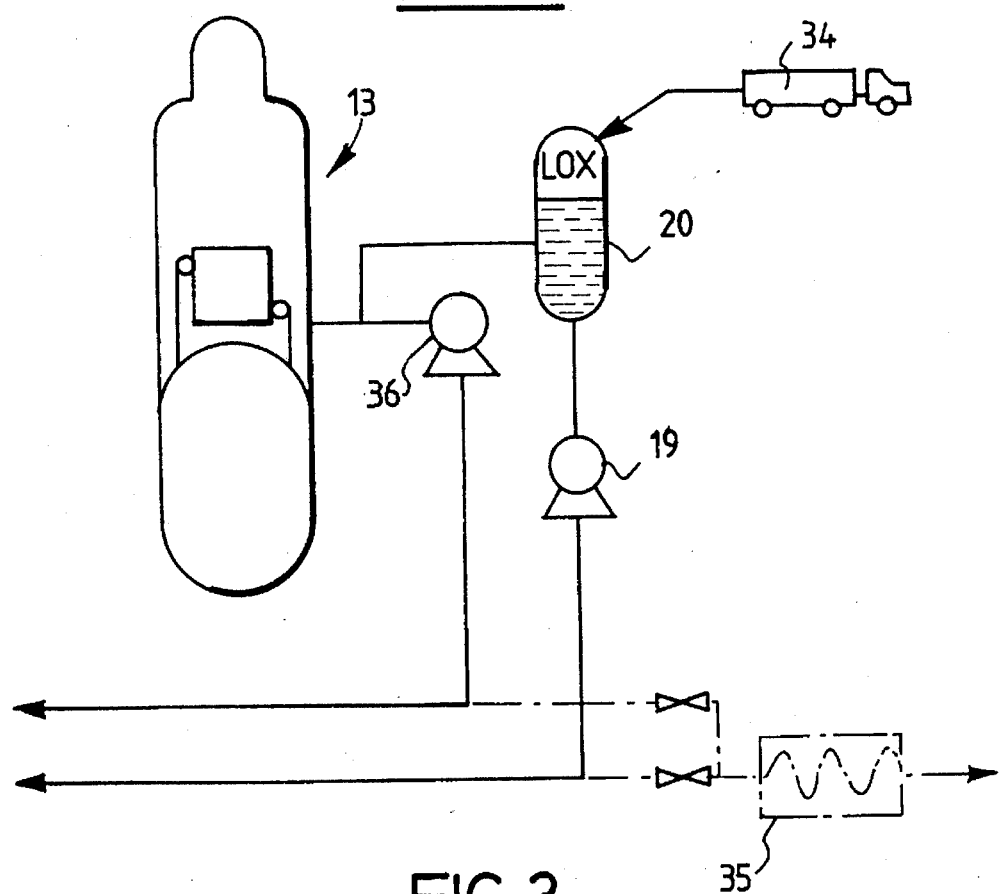

FIGS. 2 and 3 relate to the supply of the installation with gaseous oxygen under pressure at a flow rate greater than the separation capacity of the distillation apparatus 13. In these figures, all that has been shown is the double column 13 and the oxygen circuit; the rest of the installation is the same as in FIG. 1, except for the argon circuit, which is omitted.

In the case of FIG. 2, the storage 20 is supplied on the one hand from the base of column 15, and on the other hand by tank trucks 34, while the inlet of the pump 19 is connected to the base of the storage 20. Thus, the necessary flow rate of liquid oxygen can be supplied to the heat exchange line to be vaporized and reheated. Excess liquid oxygen vaporized, which is to say the quantity supplied by the tank trucks, supplies the cold which can be as before recovered in the form of additional liquid nitrogen sent to storage 18.

As indicated in FIG. 3, as a modification, the diagram of FIG. 2 can be completed by a second liquid oxygen pump 36 whose inlet is connected to the base of column 15, the outputs of the two pumps can be connected to the same vaporization passages of the heat exchange line, or even to separate vaporization passages.

As indicated in mixed lines, the output of the pump 19 and/or 36 can also, in case of need, for example for safety's sake, be connected to a conventional auxiliary vaporization apparatus 35 such as a bath. In this manner of operation, the cold contained in the vaporized liquid oxygen is of course lost.

In each of the cases of FIGS. 2 and 3, the distillation apparatus can progressively fill the storage 20, during periods of low demand for oxygen by the consuming installation and/or during periods of low electrical energy cost, while this storage progressively empties during periods of high demand and/or of high cost of electrical energy and must then if desired be supplied from tank trucks. If the oxygen demand is permanently higher than the capacity of the distillation apparatus, the supply by tank trucks must of course be effected regularly.

As a modification, the storage 20 in FIG. 3 may not be connected to the double column 13 and may be supplied only by tank trucks 34. In this case, the purity of the oxygen delivered by these latter can be different from that of the oxygen produced by the double column.

The invention is also applicable to an air distillation apparatus comprising a single column, for example an argon vaporization arrangement such as that of FIG. 1 but in which the apparatus 13 is a simple production column for nitrogen of the HPN (High Purity Nitrogen) type, associated with a Claude air cycle analogous to that described above. In this case, the vaporization of the argon permits producing an excellent liquid nitrogen.

What is claimed is:

1. A process for supplying a consuming installation with at least one constituent of air from a gas under pressure, liquefiable at a cryogenic temperature under this pressure, comprising:

distilling air in a distillation apparatus having a heat exchange line in which at least one heat transfer fluid is circulated at a high pressure substantially greater than an operating pressure of the distillation apparatus;

storing at least intermittently at least one constituent of argon in liquid phase;

producing at least one portion of said gas under pressure by bringing argon in liquid phase withdrawn from said storing to a vaporization pressure greater than its storage pressure; and vaporizing said withdrawn argon in liquid phase under said vaporization pressure in said heat exchange line;

wherein said storing is effected at least in part from a source of argon in liquid phase external to said distillation apparatus.

2. A process according to claim 1, and recovering at least a part of the heat of vaporization of said argon in liquid phase by producing an additional flow of a liquefied constituent of air.

3. A process according to claim 1, further comprising producing simultaneously at least one constituent of air under pressure withdrawn from the distillation apparatus while bringing this constituent in liquid phase to a vaporization pressure greater than its withdrawal pressure, and vaporizing this liquid under this vaporization pressure in the heat exchange line.

4. A process according to claim 1, wherein the flow rate of said argon in liquid phase is greater than the flow rate of gas in liquid phase produced at the same instant by the distillation apparatus.

5. A process according to claim 1, wherein said vaporization is effected continuously.

6. A process according to claim 4, wherein, during certain periods, there is sent from the distillation apparatus to the storage gas in liquid phase, and, during other periods, said vaporization is effected.

7. A unit for supplying to a consuming installation at least one constituent of air from a gas under pressure, liquefiable at a cryogenic temperature under this pressure, comprising an apparatus for the distillation of air, comprising a heat exchange line which comprises passages for at least one heat transfer fluid under high pressure substantially greater than a pressure of operation of the distillation apparatus, the unit also comprising a storage for argon in liquid phase adapted to be supplied in an intermittent fashion, and means for compression of said argon in liquid phase, connected upstream of vaporization passages under pressure for this gas in the heat exchange line, further comprising means for supplying to said storage said argon in liquid phase from a source external to said distillation apparatus.

8. A unit according to claim 7, wherein the compression means is connected upstream of an auxiliary revaporization apparatus.

9. A unit according to claim 7, wherein the compression means are connected solely to the storage, and the storage is connected to the distillation apparatus.

10. A unit according to claim 9, further comprising a pump for said argon in liquid phase, whose inlet is connected to the distillation apparatus.

11. A unit according to claim 10, wherein the output of the pump is connected to vaporization passages of the heat exchange line separate from those connected to said compression means.

12. A process as claimed in claim 1, wherein said external source is a tank truck.

13. A unit according to claim 7, wherein said external source is a tank truck.

* * * * *